United States Patent [19]

Dienes et al.

[11] 3,904,982

[45] Sept. 9, 1975

[54] BROAD BAND EXCIPLEX DYE LASERS

[75] Inventors: Andrew Dienes, Middletown; Charles Vernon Shank, Holmdel; Anthony Marion Trozzolo, Murray Hill, all of N.J.

[73] Assignee: Bell Telephone Laboratories, Incorporated, Murray Hill, N.J.

[22] Filed: Sept. 5, 1972

[21] Appl. No.: 286,256

Related U.S. Application Data

[63] Continuation of Ser. No. 37,825, May 15, 1970, abandoned.

[52] U.S. Cl. ..................... 331/94.5 L; 252/301.2 R
[51] Int. Cl. ............................................... H01s 3/20
[58] Field of Search .......... 252/301.2 R; 331/94.5 L

[56] References Cited
UNITED STATES PATENTS

| | | | |
|---|---|---|---|
| 3,521,187 | 7/1970 | Snavely | 252/301.2 R |
| 3,541,470 | 11/1970 | Lankard et al. | 252/301.2 R |
| 3,582,814 | 1/1971 | Duguay et al. | 331/94.5 L |
| 3,684,979 | 8/1972 | Myer et al. | 331/94.5 L |

OTHER PUBLICATIONS

Srinivasan IEEE J. Quantum Electronics 5, Nov. 1969, p. 552–553.

*Primary Examiner*—Arthur P. Demers
*Attorney, Agent, or Firm*—G. S. Indig

[57] ABSTRACT

Dye lasers in which emission is produced simultaneously from an exciplex and an electronically excited unreacted species lase over a broad band of wavelengths generally in the visible spectrum. Tunability over a bandwidth in excess of 1700 Angstroms has been achieved in an exemplary device.

2 Claims, 4 Drawing Figures

BROAD BAND EXCIPLEX DYE LASERS

CROSS REFERENCE TO RELATED APPLICATION

This application is a continuation of my copending application, Ser. No. 37,825, filed May 15, 1970, now abandoned.

BACKGROUND OF THE INVENTION

1. Field of the Invention

The invention is concerned with dye lasers, the outputs of which may be turned over a broad range of wavelengths.

2. Description of the Prior Art

The laser technology has advanced to a sophisticated level during the past decade. Laser action has been reported in solid, liquid, and gaseous media as well as in plasma; it has resulted as a bulk phenomenon both in stagnant and flowing media and has also been seen as a junction phenomenon in the semiconductor device. Excitation has been produced by diverse pumping means including light (continuous, pulsed, incoherent, coherent), collision brought about by electric fields, chemical reaction, etc.

Initial interest in the laser was, in part, due to the well-defined emission modes resulting in exceedingly narrow linewidth output which made possible the specification of a coherent light source of a wavelength with a precision of less than an Angstrom unit. Lasers operating in but a single or small number of well-defined modes continue to be of significance.

It has become apparent, however, that this very characteristic and the relatively small number of operating laser systems severely limits the available wavelengths of coherent light sources. A variety of approaches have been taken to overcome this restriction. For example, there are now available efficient second-harmonic generating elements which effectively double the variety of available wavelengths. Work is also being done on higher order harmonics. Another approach involves parametric downshifting and there have been several reports of devices operating on this principle resulting in emission of a variety of wavelengths from a single source.

An entirely different approach involves laser media which may, themselves, emit at a variety of wavelengths. Selection of a particular wavelength in such media is accomplished by "tuning" the cavity so as to favor the desired emission wavelength.

A particularly promising class of tunable laser media includes organic dyestuffs and, so, devices utilizing succh media have come to be known as "dye" lasers. Two references describing the state of the art are, Vol. 16 No. 1, *Applied Physics Letters*, p. 3, Jan. 1970, and Vol. 9, No. 1, *Angew. Chem. Int'l Edition*, p. 9 (1970). Together these references suggest several systems, appropriate pumps, device configurations, and tuning means. Some of these systems involve solvents of such nature as to influence the laser action of the solute dyestuffs, sometimes by complexing.

In general, while the dye laser approach to tunability is under active investigation, devices thus far produced have limited tunability. Tunability for the best reported devices has extended over a range of only about 400 Angstroms.

SUMMARY OF THE INVENTION

In accordance with the invention, broad tunability range in dye lasers results by use of media of such nature that emission is produced approximately simultaneously from at least two electronically excited species. The first of these species is that of an unreacted constituent which is merely excited from the system ground state. The second is an electronically excited reaction product which forms only from the excited unreacted constituent. This latter excited species results in a downshift in emission frequency, and the resulting tunability range is the composite range resulting from the two emission species.

In the general description of this invention, use is made of the term "exciplex". This term generally connotes a complex formed in the excited state (and unstable in the electronically relaxed state). It is traditionally applied to a variety of excited state materials including those resulting from (1) reaction of electron-donor acceptor pairs, (2) excimers (produced by combination of two identical or nearly identical reactants), and (3) complexes produced by protonation, i.e, by reaction in acid media. All such conventional exciplex forms are suitably utilized in accordance with the invention, and preferred chemical classes are included in the Detailed Description. For these purposes the term exciplex is used also in a somewhat unorthodox manner to designate dissociative reaction products (also resulting only from reaction of electronically excited material and also unstable in the electronically relaxed state). The prime example is a compound which loses one or more protons (or the deuterated equivalent).

The inventive desideratum is simply accomplished in any of the above cases. The acceptor-donor type of exciplex is prevented from going to completion simply by using appropriate concentrations of either or both of the reactants. Unreacted excimer moieties may be retained simply by working in fairly dilute solution (concentrations of the order of $10^{-5}$ to $10^{-3}$ molar are appropriate). The concentration of protonated exciplexes relative to that of the excited unreacted species is controlled by regulating the acidity range. Coexistence of dissociated excited species and undissociated excited species is assured by controlling the proton affinity of the system.

DETAILED DESCRIPTION

1. Suitable Media

Figure 1:
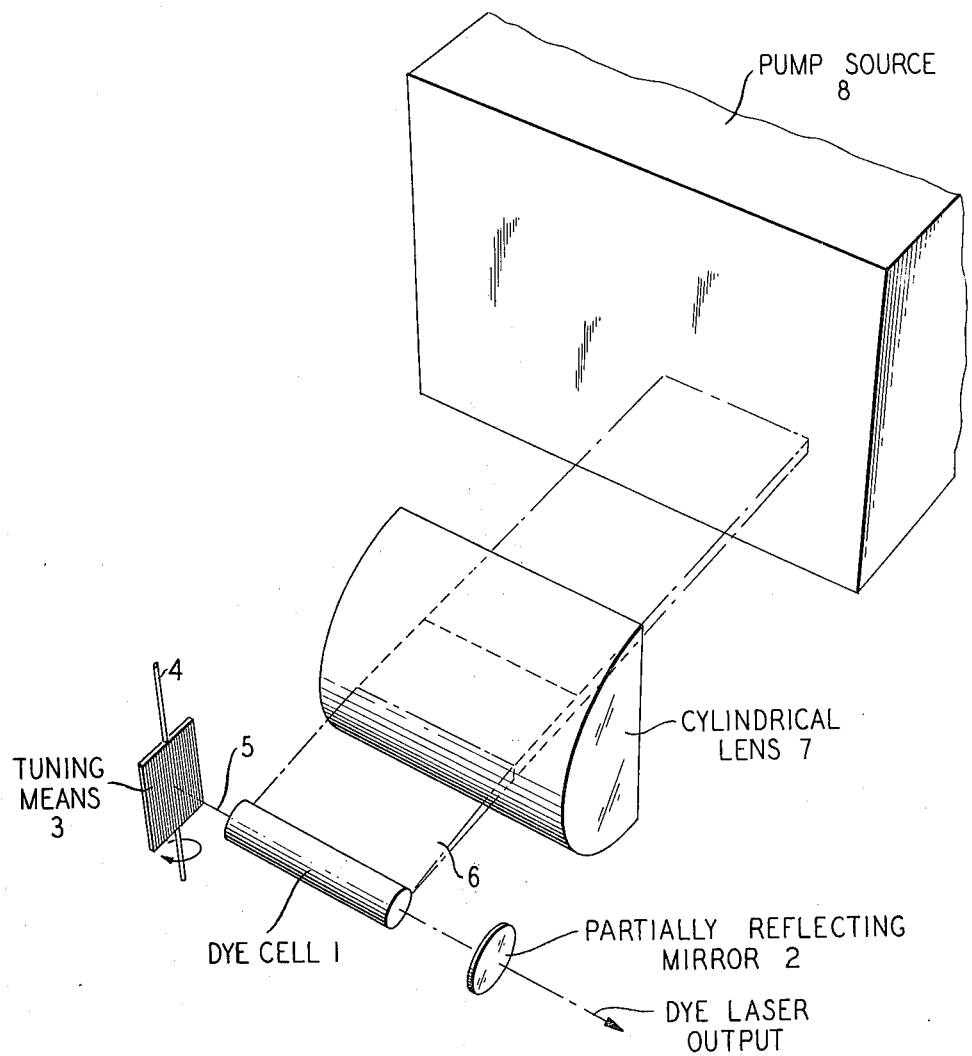
FIG. 1 is a perspective view of an exciplex dye laser in accordance with the invention. It includes an illustrative pump and tuning means.

The invention relies on the coexistence of at least two excited species (one exciplex and one an excited form of an unreacted ingredient), both of which contribute to the tunability laser bandwidth. The invention is broadly described in such conceptual terms. For a significant increase in tunability relative to that of either of the extreme forms (the pure exciplex laser and the conventional dye laser), there should be a significant shift in peak emission for the two excited species. Broadly, a shift of as little as 100 Angstroms in wavelength, since it results in a tunability range increase of the order of at least about 100 Angstroms, is sufficient for the inventive purpose. In a preferred embodiment, however, it is prescribed that this separation be at least about 500 Angstroms. Some of the exemplary systems (A, B and C) are discussed in terms of this preferred embodiment.

It should be stressed that the inventive concept is that set forth above and is not concerned with other conditions necessary for laser operation. For example, while many of the laser media so described are effectively optically pumped by existing coherent and incoherent sources, others, at least from the commercial standpoint, may await further developments. While description is largely in terms of optical pumping, it should be understood that any pump means effective in electronically exciting the unreacted species to produce the exciplex is suitable. Such alterante pump means would include particle excitation, field induced collision, chemical reactions, etc.

While the borad tunability range which is the main inventive objective implies a noncrystalline medium, it is not necessary that acceptable media be highly fluid. Dye lasers have been operated in rigid amorphous media which show no measurable flow under operating conditions.

Most effective laser action requires high quantum efficiency, low threshold, a minimum of radiationless processes, minimization of formation of the relatively stable triplet state, chemical and physical durability, etc. Such considerations will be taken into account by the practitioner utilizing the inventive teaching. It is not considered necessary to the scope of the present invention to deal with such considerations in detail.

Exemplary systems are first discussed in terms of exciplex formation, following which, discussion is directed to the conditions necessary for coexistence of the different excited-state materials.

A. The first class relies on formation of an exciplex from an acceptor-donor pair. Either of the members may serve as solvent, either or both in the unreacted form may be excited to an electronic state suited for lasing, or in other terms, either or both in the unreacted form may serve as the absorbing species. The terms "acceptor" and "donor" refer to an electron transfer, and it is to this mechanism that exciplex formation in this category is attributed. The members of the pairs are discussed separately:

1. The Acceptor is a polycyclic aromatic hydrocarbon containing from 2 to 5 rings. Acceptable members include monalkyl and dialkyl derivatives as well as monochloro derivatives. Typical members include:

naphthalene
anthracene
pyrene
Diphenyl
1,1,4,4 tetraphenyl butadiene
chrysene

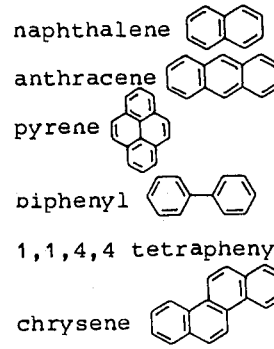

2. The Donor is a substituted teritiary amine in which both hydrogens have been replaced. It may be either of two types, i.e., X—N—Y$_2$ where X is phenyl or naphthyl and Y is an alkyl substituent such as methyl, ethyl, propyl or butyl, or (2) of the type Y$_2$N—Z—NY$_2$ where Y is again any alkyl substituent and Z is an aromatic grouping this time including biphenylene as well as phenylene or naphthylene.

B. This class relies on excimer formation. The only members of this class which are known to produce the inventive requirement are pyrene and monochloro derivatives thereof.

C. The third category relies on protonation and, therefore, requires an acid medium. The following sub-categories meet the inventive requirements.

1. <u>Indoles</u> 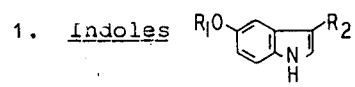

where $R_1$ = —H, or an alkyl $R_2$ = —H, —CH$_3$, CH$_2$—CH$_2$NH$_2$, or

CH$_2$COOH, —CH$_2$—CH—CO$_2$H
$\quad\quad\quad\quad\quad\quad\quad\quad\quad\quad$ |
$\quad\quad\quad\quad\quad\quad\quad\quad\quad\quad$ NH$_2$ Examples
R$_1$ =R$_2$=H 5-hydroxy indole
R$_1$=H; R$_2$=—CH$_2$—CH$_2$ —$_{NH2}$ (serotonin)

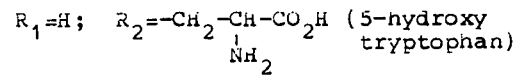 (5-hydroxy tryptophan)

2. 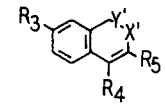

when Y' = -O-, X' = >C=O, $R_3$ = -OH, $R_4$ = -H, or -$CH_3$ or -$C_2H_5$ when Y' = -N=, X' = -CH, $R_3$ = -H, $R_5$ = -OH or $R_3$ = OH or $R_4$ = H or OH when Y' = -N=, X' = -CH, $R_3$ = -H, -OH, $R_4$ = -H, OH, $R_5$ = -OH Examples: HO—[coumarin with $CH_3$]—O, HO—[quinolinone with H,N]—O 3. [benzene ring with X'', Y'']

when X'' = >C=O, Y'' = >NH.

when X''' = CH, Y''' = >N

Examples: [acridine], [acridone with =O]

D. Dissociative exciplex species resulting in a shift of the order of at least 100 Angstroms may be categorized as any aromatic compound containing from 1 to 5 aromatic rings and having at least one hydroxyl substituent on a ring provided it does not contain either a nitro substituent or more than two halogen substituents. Any ring may be heterocyclic. Other substituents are unimportant, the general requirement being a phenol moiety.

Examples: [naphthol with OH], HO—[coumarin with $CH_3$]—O

The inventive objective is considered achieved when at least 10 molecular percent of the total excited species is different from the remainder, i.e., when at least 10 percent of the quanta produced in an untuned cavity of sufficiently broad band to accommodate the entire emission spectrum results from such species different from the remainder. Molecular percent, therefore, has reference to the total number of units of excited species. The exciplex units are the complex molecules (or dissociated equivalent) while the unreacted excited molecules correspond with the ground state ingredient.

While precise chemical contitions assuring coexistence of the excited-state materials vary in accordance with the chemical system of concern, approximate guidelines may be presented:

A. For acceptor-donor exciplexes, the inventive condition may be achieved simply by maintaining an excess of 20 mol percent of an excitable, unreacted species. Alternatively, the objectives may be achieved by inclusion of but sufficient reactant to result in the necessary exciplex concentration (maximum of 90 percent).

B. For excimer formation, it is necessary only to use a dilute solution, i.e., of the order of from $10^{-5}$ M to about $10^{-3}$ M.

C. For protonated exciplexes, coexistence to the extent required is assured merely by regulating acidity. For the Coumarin derivative system, the inventive range results for the acidity range of from about 4 to about 6 as measured on a pH meter.

D. For the dissociative exciplex systems, the required excited state mixture is accomplished by regulating proton affinity either by controlling the base strength or by controlling the concentration of base. See, for example, A. Weller, *Progress in Reaction Kinetics*, Vol. 1, pp. 196–214 (Pergamon Press, New York, 1961).

2. The Figures

The apparatus of FIG. 1 depicts a dye laser cell 1 which may be a liquid contained in a cylindrical vessel or may be a rigid amorphous body within a cavity defined at one end by a partially reflecting mirror 2 and at the other end by a tuning means. Tuning means 3 may constitute a diffraction grating rotatable about an axis 4 so as to act as a wavelength selective mirror for beam 5. Alternative tuning means inludes an acousto-optic element in which effective grating spacing is altered by changing the frequency of the elastic wave as well as displaceable arrays of dielectric or other pass filters, etc. Pumping is, in this instance, optical with pumping beam 6 being focused on element 1 by cylindrical lens 7. Beam 6 may, for example, be the electromagnetic emission of pump 8. Pump 8 may be a coherent source as, for example, a neon, nitrogen, argon or a cadmium laser. It may be a long wavelength laser followed by one or more up-shifting elements as, for example, a neodymium YAG laser followed by one or more SHGs. Alternatively, pump 8 may be an incoherent source, for example, a flash lamp or a continuous lamp such as an xenon or mercury vapor lamp. The pump source should, of course, be such as to approximately match an efficient region of the absorption spectrum of the relevant unreacted species. Generally, although not invariably, the absorption spectrum peaks in the upper portion of the visible spectrum or in the ultraviolet and resulting tunability ranges lie largely within the visible spectrum. It is conceivable that systems may exist in which both pump spectra and emission spectra are downshifted so that the tunability range extends into the infrared spectrum. Systems thus far investigated have not been so characterized. The principle of operation, however, remains identical.

Figure 2A:
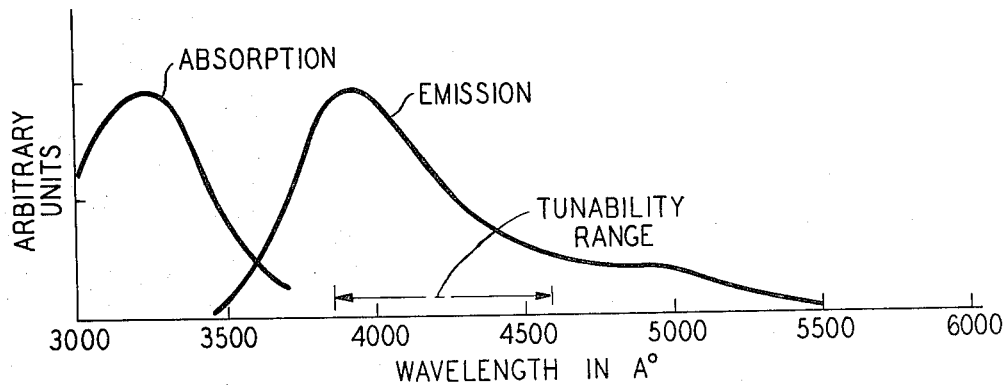
FIGS. 2A, 2B and 2C, arbitrary units on the ordinate and wavelength in Angstrom units on the abscissa, are sbsorption and emission spectra for a conventional type of dye laser, an exciplex laser, and for a laser, in accordance with the invention, respectively.
Figure 2B:
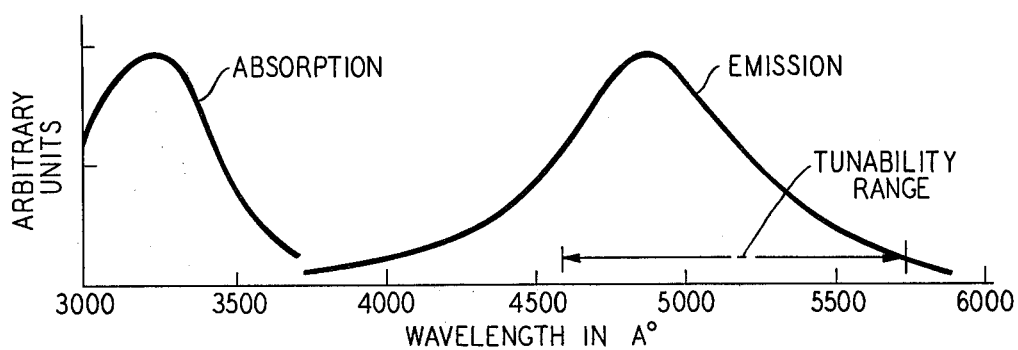
Figure 2C:
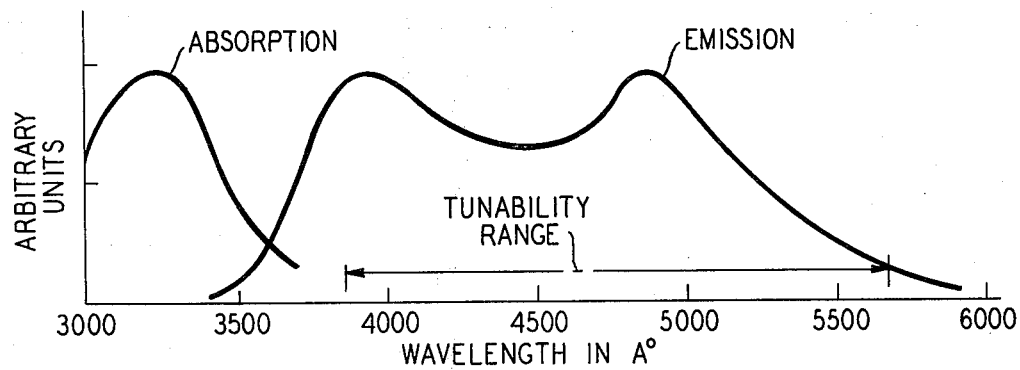

FIGS. 2A, 2B and 2C depict comparable results in accordance with the example and are discussed in that subsequent section.

3. Example

The following example selected from Class A under section 1 above is illustrative. The experimental arrangement was that of the FIG. 1 and utilized a transverse optical pumping configuration with a pulsed nitrogen laser. The laser had a 100 kilowatt peak power output at 3371 Angstroms and was capable of a 100 pulse per second repetition rate. The dye laser cavity consisted of a 30 percent reflectivity broad band dielelctrically coated flat output mirror, and the tunning means was a standard grating blazed at 5000 Angstroms with 1200 lines per millimeter. The tuning range was determined by measuring with a monochrometer with tuning being accomplished by rotating the grating in the manner described in conjunction with the figure.

The dye used in this experiment was 4-methylumbelliferone

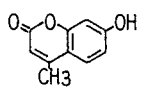

In this experiment, a $5 \times 10^{-3}$ M solution of dyestuff in ethanol was acidified with the addition of one part in 30 of 0.1 M HCl.

Laser action was observed over a tunability range of 1760 Angstroms (from 3910 Angstroms to 5670 Angstroms). The same experiment was conducted in a sufficiently acid solution to result in substantial completion of exciplex formation and also in neutral solution so that operation was as a conventional dye laser. Tunability ranges were 1150 Angstroms (from 4590 Angstroms to 5740 Angstroms) and 720 Angstroms (from 3850 Angstroms to 4570 Angstroms), respectively. The results of these comparative runs are set forth in FIGS. 2A, 2B and 2C. These figures in ordinate units of arbitrary absorption and emission amplitude and abscissa units of wavelength in Angstrom units depict the absorption and emission spectra of the neutral, the pure exciplex, and the neutral-exciplex laser medium of the invention, respectively.

What is claimed is:

1. Dye laser comprising a resonant cavity defined by two end members at least one of which is a partially reflecting member through which laser output is transmitted, said cavity containing a medium consisting essentially of a solution of at least two ingredients, one of which in its unmodified state is electronically excitable to produce a first lasing species, and at least one of which undergoes a chemical change in its electronically active state to produce a second lasing species, said laser including means for producing a population inversion therein together with means coupled to said medium for stimulating the emission of a coherent beam of radiation from said population inverted medium, characterized in that the reaction conditions are such that both of said first and second lasing species are produced each in a minimum amount of 10 mol percent based on the total amount of electronically active material produced, and in which the said partially reflecting member is partially reflecting over a bandwidth defining a laser output spectrum including wavelenghts within the spectra of said first and second lasing monoalkyl, but extending beyond the individual spectrum of each of the said species so as to transmit laser output over such bandwidth and in which the peak emission wavelength of the said first and second lasing species are separated by a wavelength change of at least 500 Angstrom units, in which one ingredient is an electron acceptor, and in which a second ingredient is an electron donor, and in which the said electron acceptor is selected from the group consisting of unsubstituted polycyclic aromatic hydrocarbons containing from 2 to 5 rings as well as monalkyl, dialkyl and monochloro derivatives thereof, and the electron donor is selected from the group consisting of tertiary amines selected from the group consisting of X–N–Y$_2$ and Y$_2$-N—Z—NY$_2$ where X is phenyl or naphthyl, Y is an alkyl grouping, and Z is phenylene, napthylene or biphenylene.

2. Dye laser comprising a resonant cavity defined by two end members at least one of which is a partially reflecting member through which laser output is transmitted, said cavity containing a medium consisting essentially of a solution of at least two ingredients, one of which in its unmodified state is electronically excitable to produce a first lasing species, and at least one of which undergoes a chemical change in its electronically active state to produce a second lasing species, said laser including means for producing a population inversion therein together with means coupled to said medium for stimulating the emission of a coherent beam of radiation from said population inverted medium, characterized in that the reaction conditions are such that both of said first and second lasing species are produced each in a minimum amount of 10 mol percent based on the total amount of electronically active material produced, and in which the said partially reflecting member is partially reflecting over a bandwidth defining a laser output spectrum including wavelengths within the spectra of said first and second lasing species but extending beyond the individual spectrum of each of the said species so as to transmit laser output over such bandwidth and in which the peak emission wavelength of the said first and second lasing species are separated by a wavelength change of at least 500 Angstrom units, in which one ingredient is a compound which is protonated in its excited singlet state and in which a second ingredient results in a medium of acidic pH, and in which one of the mentioned ingredients is a compound selected from the group consisting of 1. Indoles 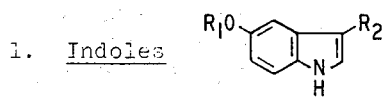

where $R_1$ = –H, or alkyl $R_2$ = –H, –CH$_3$, –CH$_2$–CH$_2$–NH$_2$,

–CH$_2$COOH, –CH$_2$–CH–CO$_2$H
                          |
                          NH$_2$ or

2. 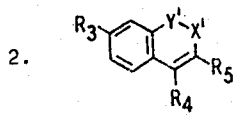
when Y' = -O-, X' = >C=O, $R_3$ = -OH, $R_4$ = -H or -$CH_3$, or -$C_2H_5$
when Y' = -N=, X' = -CH, $R_3$ = -H, $R_5$ = -OH or
$R_3$ = OH or
$R_4$ = H or OH
when Y' = -N=, X' = -CH, $R_3$ = -H, -OH, $R_4$ = -H, -OH, $R_5$ = -OH
3. 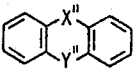
when X'' = >C=O, Y'' = >NH
when X'' = CH, Y'' = >N.
* * * * *

UNITED STATES PATENT AND TRADEMARK OFFICE
CERTIFICATE OF CORRECTION

PATENT NO. : 3,904,982
DATED : September 9, 1975
INVENTOR(S) : Andrew Dienes, Charles V. Shank, and Anthony M. Trozzolo It is certified that error appears in the above-identified patent and that said Letters Patent are hereby corrected as shown below:

Column 4, line 36, "$R_1 = H; R_2 = -CH_2 -CH_2 -_{NH2}$" should read --$R_1 = H; R_2 = -CH_2 - CH_2 -NH_2$--.

Column 7, line 13, "tunning" should be --tuning--.

Column 8, line 9, "second lasing monoalkyl" should read --second lasing species--.

Column 8, line 24, "naphthyl" should read --napthyl--.

Signed and Sealed this

Third Day of August 1976

[SEAL]

Attest:

RUTH C. MASON
*Attesting Officer*

C. MARSHALL DANN
*Commissioner of Patents and Trademarks*